UNITED STATES PATENT OFFICE.

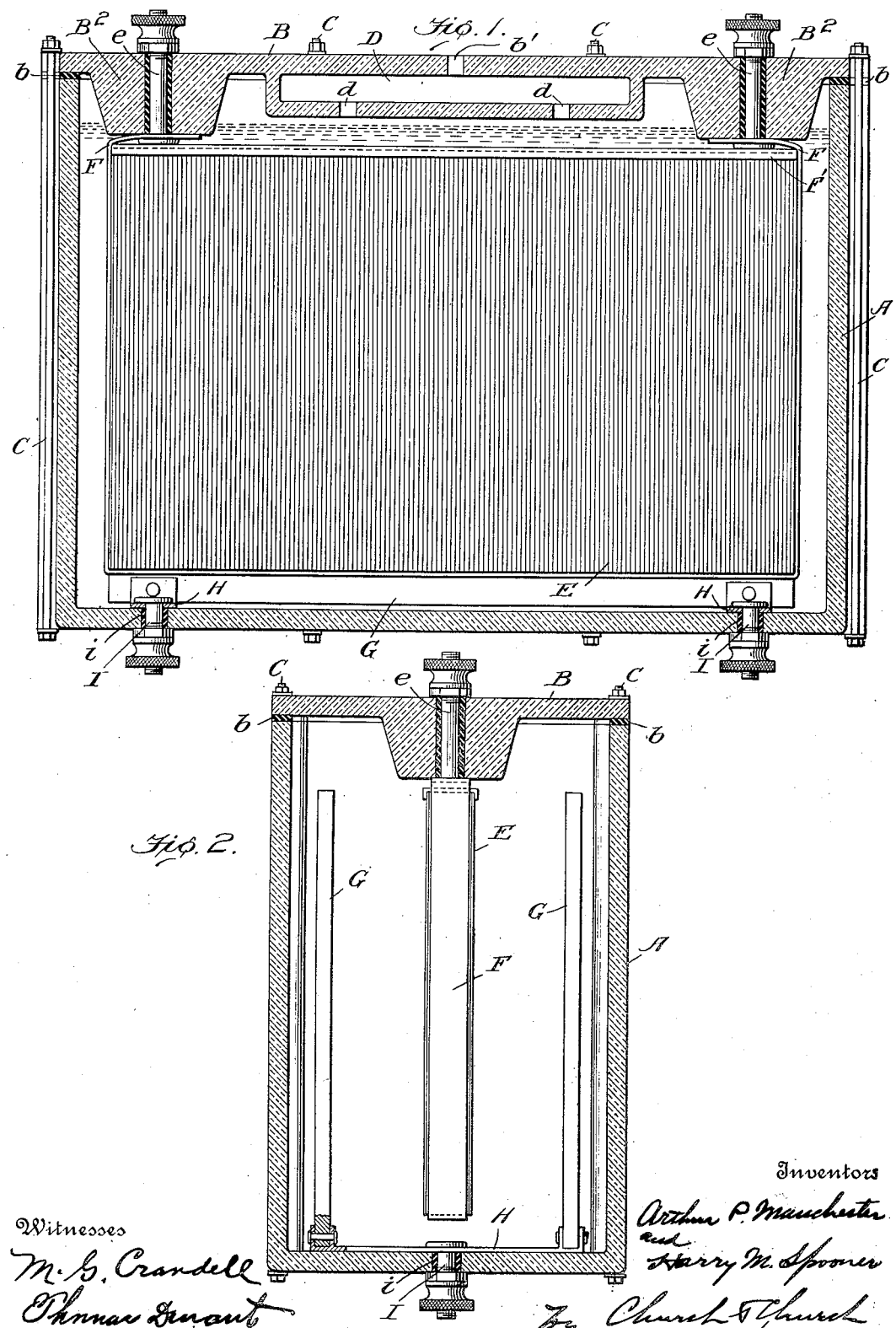

ARTHUR P. MANCHESTER, OF PROVIDENCE, AND HARRY M. SPOONER, OF CRANSTON, RHODE ISLAND.

BATTERY.

1,378,549. Specification of Letters Patent. Patented May 17, 1921.

Application filed December 16, 1912. Serial No. 736,969.

*To all whom it may concern:*

Be it known that we, ARTHUR P. MANCHESTER and HARRY M. SPOONER, citizens of the United States, and residents of Providence, in the county of Providence and State of Rhode Island, and Cranston, in the county of Providence and State of Rhode Island, respectively, have invented certain new and useful Improvements in Batteries; and we do hereby declare the following to be a full, clear, and exact description of the same, reference being had to the accompanying drawing, forming part of this specification, and to the figures and letters of reference marked thereon.

This invention relates to primary electric batteries, the object of the invention, generally stated, being to provide a battery which is more economical and reliable than batteries in common use and with which the output will be maintained with great uniformity, even under adverse conditions of usage. In accomplishing the desired ends the invention has in view the reduction of internal resistance and polarization, as well as the reduction of any destructive action of the electrodes save such as is incident to the production of electrical energy; in other words, any useless destructive action is reduced to a negligible factor with the result that a maximum electrical output is obtained with a minimum consumption of battery material. As incident to this result, the counter-electromotive force due to local electrolytic action is practically eliminated or reduced to a negligible factor.

A further object of the invention is to provided a primary battery having a gelatinous alkaline electrolyte having a minimum causticity, and with which the electromotive force of the battery will not be reduced or impaired, nor the life of the electrolyte shortened.

The invention consists, generally stated, in a battery embodying positive and negative electrodes free from iron, but both having a metallic base, as, for example, a positive electrode of zinc, and a negative electrode of two copper oxids with a gelatinous alkaline electrolyte such, for example, as sodium hydroxid substantially free from iron and silica. The invention further consists in an improved process of making the negative electrode and in certain novel details of construction and combinations and arrangements of the parts and elements constituting the battery, all as will be hereinafter described and pointed out particularly in the appended claim.

A preferred mechanical arrangement of battery cell is illustrated in the accompanying drawings, in which,—

Figure 1 is a central longitudinal section through the cell; and

Fig. 2 is a transverse section substantially in the plane of the electrode terminals at one end of the cell, the electrodes being shown in elevation.

The container A is preferably rectangular and of glass or suitable glazed vitreous material such as will not cause the production of sulfites, sulfids or sulfates, in the electrolyte. The cover B is of similar material preferably clamped down on the container A by vertically arranged clamping bolts C, a suitable soft rubber gasket $b$ being interposed to prevent any possible escape of the electrolyte or the creeping of salts from the interior of the cell. The cover is preferably provided with a vent opening $b'$ below which there is a chamber D located above the electrolyte and having vent openings $d$ leading into the same at points remote from the vent opening $b'$, this arrangement being designed to prevent possible escape of the electrolyte or the creeping of the salts by capillary action through the vent opening $b'$, so as to become apparent on the exterior of the cell.

The electrodes are designed to be entirely submerged or immersed in the electrolyte and with this object in view the negative electrode E, of a character to be presently described, is suspended from two terminal contact supports in the form of bolts $e$ extending up through apertures in the cover and surrounded with soft or pure rubber bushings so as to make liquid tight closures. The upper ends of said bolts are adapted for the reception of any ordinary terminal connector devices and at their lower ends or within the cell they extend through the ends of a copper strip F which passes around the electrode edgewise so as to support the same throughout and make an extended electrical contact therewith. In addition, the upper edge of the electrode E is provided with a copper cap F' which is firmly clamped to the electrode and with which the terminals make electrical connection.

The upper edge of the electrode E rests in proximity to and is positioned by downwardly extending lugs or projections B² on the cover B, whereby the top of the electrode is located at a point or level below the surface level of the electrolyte.

The positive electrode preferably in the form of two plates G, located one on either side of the electrode E, spaced from the side walls of the cell, and connected at their lower edges by transverse bridges H of copper or zinc are adapted to rest on the bridge properly spaced from the bottom of the cell with their upper edges approximately at the level of the top of the electrode E. The terminal contacts are extended from the bridges H through the bottom of the cell. These terminal contacts or terminals, lettered I in the drawings, are conveniently in the form of bolts which clamp the bridges H to the bottom of the cell and are surrounded by pure rubber bushings $i$ competent to form tight joints and prevent the escape of electrolyte. The two terminals are preferably provided for each of the electrodes, the terminals at each end of the cell being in the same transverse plane whereby the cells may be stacked one upon the other with the terminals in contacting position, should it be desired to couple a number of cells up in series.

The negative electrode which is employed, is, so far as we can determine, composed of a minimum quantity of metallic copper and two copper oxids, i. e., cupric oxid (CuO) and cuprous oxid (Cu₂O) and the electrolyte is sodium hydroxid (NaOH) rendered gelatinous by the addition of starch thereto under conditions which will be presently described, but it will be understood that we do not wish to be limited strictly to the specific and technical definition of the ingredients referred to, inasmuch as the best results are attained by a definite treatment of the ingredients in the preparation of the battery elements, and are due to causes which are of a complex character.

In the making of the electrolyte, sodium hydroxid (NaOH) free from iron and preferably also free from silica is dissolved in water to make a solution of substantially 28 gravity Baumé. Vegetable starch is then mixed with the sodium hydroxid solution. The mixing may be effected by stirring the solution with a glass rod, then the solution is heated with occasional stirring until it reaches a temperature of approximately 180° F. when the heat is immediately shut off and the electrolyte stirred thoroughly and allowed to cool to a temperature where it will still flow and may be poured directly into the cell, in which it further cools and assumes a jelly-like consistency which does not change materially in the use of the cell.

The electrolyte thus produced maintains its stability and moisture content due apparently to the electrolytic action and is of such character that the internal resistance of the battery is not increased to an appreciable extent by use when said electrolyte is used in connection with a negative electrode of the character to be presently described.

The proportions of sodium hydroxid (NaOH), water and starch may be determined by quantitative analysis; thus such analysis shows that 4 grs. of starch are required to gelatinize 60 minims or 1 dram of water. It also shows that about 10 pounds of sodium hydroxid (NaOH) will make about 4 gallons of electrolyte at 28 gravity Baumé. It also shows that it requires one-sixth as much starch to gelatinize the alkaline electrolyte 28 gravity Baumé as it does to gelatinize water to produce a finished product having about thirty gravity Baumé. To give a concrete example, 10 pounds of sodium hydroxid (NaOH) requires approximately 2,731 grs. (specifically 2,730⅔ grs.) of starch to gelatinize it when in a solution of 28 gravity Baumé and 1 pound of sodium hydroxid will require approximately 273.1 (specifically 273.0⅔) grs. of starch in a solution of 28 gravity Baumé.

The temperature to which the electrolyte is subjected has been found to be an important factor but it has been found in treating large batches of the material when the heat is cut off after the mass reaches a temperature of 180° F. the temperature may thereafter, due possibly to chemical action, continue to rise a few degrees, possibly to 190° F. To this extent the temperature of 180° stated is not to be taken as absolute, yet care must be taken, first to raise the temperature to a point, where the gelatinizing of the sodium hydroxid will be effective, and at the same time it must not be raised to a point where the solution will be discolored or the starch broken down into elements which are formed therefrom at higher temperatures, nor should the temperature be raised to a point where an excessive quantity of moisture will be driven off, thereby increasing the specific gravity of the solution. An increase in temperature above 190° has been found to be injurious, inasmuch as the efficiency of the electrolyte is greatly reduced and an excessive temperature will destroy its usefulness entirely.

In the formation of the negative electrode, the most highly efficient results have been secured when the electrode is formed by a process which is substantially as follows:

Copper, preferably in the form of a bar and free from iron content is heated to a temperature at which when sprayed with water blisters will be formed on the surface. These blisters are scraped off and fall in the form of copper flake (conveniently termed B. O. C. flake), and contain a minimum amount of metallic copper. This B. O. C. flake is now treated in any known and suitable manner to free it from any unctuous matter such as may have been derived from the scraping means employed, but its properties are not thereby changed. This treatment may consist in placing the copper flake or scale in a receptacle containing water which is raised to the boiling point and boiling the same as long as any unctuous matter accumulates on the surface of the water. This scum or unctuous matter is skimmed off, for it is essential that it be entirely eradicated from the flake or scale. This flake or scale, after it has been freed from the unctuous matter, is thoroughly washed in hot water and then placed in copper pans and dried in an oven. In the flake form it is now treated magnetically by being passed through a powerful magnetic field or succession of magnetic fields whereby primarily all metallic iron or particles to which magnetic iron is adherent, is removed, leaving a B. O. C. flake which is essentially free from iron.

The loose B. O. C. flake is now mixed with a binder formed of sugar which has been refined and clarified by bone black and is free from ultramarine blue and dissolved in water. The sugar solution is preferably composed of two parts of sugar to one part of water, complete solution being effected by bringing the mixture to the boiling point. Having mixed the flake with the binder prepared as above, it is pressed into a compact mass of the shape and size desired for the electrode and placed in a curing oven. In the curing it is subjected to a temperature which is carried up to approximately 500° F., and as the temperature rises it is found that at 365° F. the binder melts; between 400 and 420° F. it loses two molecules of water, and is converted into caramel, while at a still higher temperature it yields combustible gases leaving a residue of approximately one-fourth of its weight of charcoal.

In this condition, the electrode is ready for the baking oven, in which the temperature is raised to about 1200° F. While still at this high temperature, the electrode is placed in a drop press and compressed thereby into a hard dense and strong mass which will maintain its form and condition in the uses for which it is designed. When removed from the press the electrode is preferably allowed to cool in the open air when it is in condition for use in the battery.

In use, the electrode thus formed has a very long life as compared with electrodes which are of analogous character, and so far as we can now determine it seems that the metallic copper and cuprous oxid in the cupric oxid mass (B. O. C. flake mass) will start the electrolytic action without short circuiting or plating with copper, making the battery a self-starting battery and one which is not subject to deterioration due to local electro-chemical action.

The gelatinous electrolyte prevents the mixture of oxids from one plate to another, or, more specifically stated, the zinc oxid (ZnO) is held against or in proximity to the positive electrode, thereby in a measure protecting the electrode, and the electrolyte being in a gelatinous form, does not so readily act as a solvent, whereby the creation of conditions producing counter electromotive force is greatly retarded.

Where a liquid electrolyte is employed, if disintegration of the negative electrode occurs, polarization of the battery is likely, or should a continuous scaling (commonly called treeing) of the positive electrode occur, it might reach the negative plate and form a short circuit. With the gelatinous electrolyte, however, as contemplated herein, the $Na_2ZnO_2$ is held against the positive electrode until solution of the same takes place, which, however, occurs very slowly, owing to the gelatinous character of the electrolyte. Inasmuch as the said zincate is held against the positive plate, it acts as a protective barrier not allowing the electrode to be attacked so actively, but it does not reduce the E. M. F., because it is an oxid of the element used for the positive electrode.

The vent at the top of the cell allows hydrogen to escape, but it will be noted that the hydrogen set free by the action of the battery is also absorbed by the starch of the electrolyte, and the starch also has a tendency to remove extreme causticity without in anywise affecting the electromotive force of the battery.

It will be particularly noted that the negative electrode formed by the process herein described is practically free from foreign substance or ingredients, especially iron, and consists of pure copper oxids and copper in a finely divided condition, for which reason it may be compacted into a more dense mass, and the danger of the electrode becoming soft and porous in use is very much reduced if not entirely eliminated, a result which in previous batteries has not been successfully attained.

While we have specifically described the use of sodium hydroxid (NaOH) as the alkaline ingredient of the electrolyte, we do not wish to be specifically limited thereto save where so specified in the claim, inasmuch as it is found that other alkaline ingredients may be employed, such, for example, as potassium hydroxid (KOH).

In the mechanical embodiment of the battery illustrated, it will be noted that the electrodes are completely submerged in the electrolyte, whereby the full surface area is available, and furthermore the electrode terminals are oppositely positioned with relation to each other, this arrangement, aside from its mechanical advantages, being adopted because of the fact that practice demonstrates that the positive electrodes particularly, are acted upon most vigorously toward their extremities remote from the terminal and by the reversal of the position of the terminals, as in the present arrangement, it becomes possible to utilize with much higher efficiency the entire substance of the electrode, as the electrochemical action is thereby distributed more uniformly and the life of the cell prolonged.

What we claim is:

An electrode for batteries formed of cupric oxid (CuO) cuprous oxid ($Cu_2O$) and the residua of a saccharine binder, the volatile and combustible elements of which have been eliminated by heat.

ARTHUR P. MANCHESTER.
HARRY M. SPOONER.

Witnesses:
THOMAS DURANT,
HALBERT BROWN.